(12) United States Patent
Damodharan

(10) Patent No.: US 7,853,546 B2
(45) Date of Patent: Dec. 14, 2010

(54) ENHANCED RULE EXECUTION IN EXPERT SYSTEMS

(75) Inventor: Gopinath Damodharan, Bangalore (IN)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 11/684,165

(22) Filed: Mar. 9, 2007

(65) Prior Publication Data

US 2008/0222070 A1 Sep. 11, 2008

(51) Int. Cl.
*G06N 5/02* (2006.01)
(52) U.S. Cl. .............................. 706/47; 706/45; 706/46; 706/48; 706/52; 707/694; 707/600; 707/737; 707/912
(58) Field of Classification Search ...................... 706/1, 706/8, 45, 47, 48, 52, 54–58, 62; 714/100, 714/1–2, 4, 15, 30, 37, 46, 47, 48
See application file for complete search history.

(56) References Cited

U.S. PATENT DOCUMENTS

| | | | | |
|---|---|---|---|---|
| 5,179,633 A * | 1/1993 | Barabash et al. | ............... | 706/48 |
| 5,263,127 A * | 11/1993 | Barabash et al. | ............... | 706/48 |
| 5,276,776 A * | 1/1994 | Grady et al. | .................. | 706/48 |
| 5,408,587 A | 4/1995 | Maier et al. | | |
| 5,487,135 A * | 1/1996 | Freeman | ....................... | 706/59 |
| 5,615,308 A * | 3/1997 | Ando et al. | .................... | 706/48 |
| 5,644,770 A * | 7/1997 | Burke et al. | ................. | 717/166 |
| 5,815,638 A | 9/1998 | Lenz et al. | | |
| 5,899,985 A * | 5/1999 | Tanaka | ......................... | 706/45 |
| 5,899,991 A * | 5/1999 | Karch | ............................ | 707/5 |
| 6,012,640 A * | 1/2000 | Liu | ........................ | 235/462.25 |
| 6,067,637 A * | 5/2000 | Auer et al. | ..................... | 714/26 |
| 6,356,885 B2 * | 3/2002 | Ross et al. | ..................... | 706/45 |
| 6,862,553 B2 * | 3/2005 | Schwenke et al. | ........... | 702/183 |
| 6,892,195 B2 | 5/2005 | Lee et al. | | |
| 6,895,575 B2 | 5/2005 | Dharamshi | | |
| 6,915,308 B1 | 7/2005 | Evans et al. | | |
| 6,968,329 B1 | 11/2005 | Chung et al. | | |
| 7,506,307 B2 * | 3/2009 | McCollum et al. | .......... | 717/117 |
| 7,506,371 B1 * | 3/2009 | Ben-Natan | .................... | 726/18 |
| 2004/0128120 A1 * | 7/2004 | Coburn et al. | .................. | 703/26 |
| 2005/0065753 A1 * | 3/2005 | Bigus et al. | .................. | 702/186 |
| 2005/0071222 A1 | 3/2005 | Bigus et al. | | |
| 2005/0166193 A1 | 7/2005 | Smith et al. | | |
| 2006/0143143 A1 | 6/2006 | Chan et al. | | |
| 2009/0226065 A1 * | 9/2009 | Chen | ........................... | 382/131 |
| 2009/0228299 A1 * | 9/2009 | Kangarloo et al. | .............. | 705/2 |

* cited by examiner

*Primary Examiner*—Donald Sparks
*Assistant Examiner*—Omar F Fernandez Rivas

(57) ABSTRACT

A method for detection is presented. The method includes extracting data based upon one or more predefined rules. Further, the method includes preprocessing the extracted data based on the predefined rules to generate one or more rule groups. The method also includes instantiating one or more inference engines based on the generated rule groups. Additionally, the method includes processing the extracted data by a corresponding inference engine based on the predefined rules to generate processed data. Systems and computer-readable medium that afford functionality of the type defined by this method is also contemplated in conjunction with the present technique.

22 Claims, 13 Drawing Sheets

| Name | Identifier | Description | Source | SYSTEM_TYPE_REF |
|---|---|---|---|---|
| RULE1 | 1 | A > 90 | WHEN A > 90 THEN <ACTION> | CT/HELIOS and CT/LIGHTSPEED |
| RULE2 | 2 | B < 90°C OR B > 100° C | WHEN B < 90 OR B > 100 THEN <ACTION> | CT/HELIOS |
| RULE3 | 3 | E = FREQ_COUNT(C) E > 5 (if number of reboots in a day exceeds the predefined limit, indicate failure | WHEN E > 5 THEN <ACTION> | CT/HELIOS |
| RULE4 | 4 | F = MAX(D) G = MAX(A) F > 100 AND G > 80 | WHEN F > 100 AND G > 80 THEN <ACTION> | CT/HELIOS |
| RULE5 | 5 | Occurrence of error code "I" or "J" then severity 3 error | WHEN I == 1 OR J == 1 THEN <ACTION> | CT/HELIOS and CT/LIGHTSPEED |
| RULE6 | 6 | Occurrence of error code "I" or "J" with error code "H" leads to severity 2 error | WHEN H == 1 AND (I == 1 OR J == 1) THEN <ACTION> | CT/HELIOS and CT/LIGHTSPEED |

FIG. 9

| Name | Identifier | Description | LOG_TYPE_REF | PARAM_TYPE | PREPROCESSOR_REF | DATA_TYPE | ASSOCIATED_PARAMS |
|---|---|---|---|---|---|---|---|
| A | 1 | | 1 | PARAMETER | | FLOAT | |
| B | 2 | | 1 | PARAMETER | | FLOAT | |
| C | 3 | | 1 | PARAMETER | | STRING | |
| D | 4 | | 1 | PARAMETER | | INTEGER | |
| E | 5 | E=FREQ_COUNT(C) | 1 | INDICATOR | 1 | INTEGER | 3 |
| F | 6 | F=MAX(D) | 1 | INDICATOR | 4 | INTEGER | 4 |
| G | 7 | G=MAX(A) | 1 | INDICATOR | 4 | FLOAT | 1 |
| H | 8 | | 3 | PARAMETER | | INTEGER | |
| I | 9 | | 3 | PARAMETER | | INTEGER | |
| J | 10 | | 3 | PARAMETER | | INTEGER | |

FIG. 10

| Identifier | PARAM_R EF_ID | START_TIME | END_TIME | VALUE | SYSTEM _TYPE_REF |
|---|---|---|---|---|---|
| 1 | 1 | T1 | T1 | 90 | Any CT/HELIOS system |
| 2 | 2 | T1 + delta | T2 + delta | 110 | Any CT/HELIOS system |
| 3 | 3 | T1 + delta | T2 + delta | 1 | Any CT/HELIOS system |
| 4 | 4 | T1 + delta | T2 + delta | 100 | Any CT/HELIOS system |
| 5 | 1 | T1 + delta | T1 + delta | 95 | Any CT/HELIOS system |
| 6 | 3 | T1 + delta | T2 + delta | 1 | Any CT/HELIOS system |
| 7 | 3 | T1 + delta | T2 + delta | 1 | Any CT/HELIOS system |
| 8 | 4 | T1 + delta | T2 + delta | 100 | Any CT/HELIOS system |
| 9 | 1 | T1 + delta | T1 + delta | 95 | Any CT/HELIOS system |
| 10 | 5 | T1 + delta | T2 + delta | 3 | Any CT/HELIOS system |
| 11 | 6 | T1 + delta | T2 + delta | 100 | Any CT/HELIOS system |
| 12 | 7 | T1 + delta | T2 + delta | 95 | Any CT/HELIOS system |

FIG. 12

ENHANCED RULE EXECUTION IN EXPERT SYSTEMS

BACKGROUND

The invention relates generally to expert systems, and more particularly to rule-based systems.

Rule-based artificial intelligence systems typically include a set of rules, one or more facts or data in a working memory, and an inference engine that applies the rules to the facts in the working memory. Further, an inference engine generally performs the steps of matching a collection of objects to a given rule, selecting a rule from a list of rules whose conditions are completely matched by the objects, and execution of the selected rule.

Currently available inference engines typically match facts (data) against business rules, to infer conclusions, which then result in actions. Furthermore, during the execution of the selected rule step, the inference engine performs an existence test in connection with the conditions in the rule. Additionally, the inference engine performs a pattern matching step, which entails matching the new or existing facts against business rules. Unfortunately, the matching process in the inference engine is the most time consuming phase as each rule is compared against all objects.

A wide variety of techniques have been developed to aid in pattern matching step. For example, algorithms such as the linear algorithm, the Rete algorithm, and the treat and leaps algorithm are used for pattern matching by inference engines. These pattern matching algorithms are best suited for a small set of facts and an extremely large number of rules. Unfortunately, in case of the large set of the facts, use of the presently available techniques entails a substantial increase in resource requirements, which disadvantageously leads to diminished performance. More particularly, use of these techniques results in substantially high memory requirements. Additionally, the currently available techniques fail to respond to complex business rule conditions thereby resulting in a time-consuming and laborious process. Furthermore, the currently prevalent techniques are not scalable and hence result in additional setup costs.

It may therefore be desirable to develop a robust technique and system for the systematic execution of rules in the rule-based system that advantageously facilitates substantially superior time performance of the rule-based systems. In particular, there is a need for faster execution of the rules in the inference engine of the rule-based system. Additionally, there is also a need for a system that may be configured to aid in simplifying the workflow of a rule-based system, thereby optimizing the performance of the rule-based system.

BRIEF DESCRIPTION

In accordance with aspects of the present technique, a method for fault detection is presented. The method includes extracting data based upon one or more predefined rules. Further, the method includes preprocessing the extracted data based on the predefined rules to generate one or more rule groups. The method also includes instantiating one or more inference engines based on the generated rule groups. Additionally, the method includes processing the extracted data by a corresponding inference engine based on the predefined rules to generate processed data. Computer-readable medium that afford functionality of the type defined by this method is also contemplated in conjunction with the present technique.

In accordance with further aspects of the present technique, a detection system is presented. The detection system includes an extractor module configured to extract data based upon one or more predefined rules. In addition, the detection system includes a processing module configured to compute data based on the predefined rules, evaluate a rule condition affinity of the predefined rules, and group the predefined rules based on the evaluated rule affinity to generate one or more rule groups. Furthermore, the detection system includes an interpreter module configured to interpret the extracted data based on the predefined rules to generate output data.

In accordance with further aspects of the present technique, a system is presented. The system includes a data source, where the data source comprises an acquisition subsystem configured to acquire data, and a processing subsystem in operative association with the acquisition subsystem and configured to process the acquired data and generate log data. Furthermore, the system includes a data storage subsystem configured to store the log data. In addition, the system includes a detection subsystem in operative association with the data storage subsystem and configured to extract data based upon one or more predefined rules, preprocess the extracted data based on the predefined rules to generate one or more rule groups, instantiate one or more inference engines based on the generated rule groups, and process the extracted data by a corresponding inference engine based on the predefined rules to generate processed data.

DRAWINGS

These and other features, aspects, and advantages of the present invention will become better understood when the following detailed description is read with reference to the accompanying drawings in which like characters represent like parts throughout the drawings, wherein:

FIG. 9 is a diagrammatic illustration of predefined rules, in accordance with aspects of the present technique;

FIG. 10 is a diagrammatic illustration of an information of interest table, in accordance with aspects of the present technique;

FIG. 12 is a diagrammatic illustration of an output data table, in accordance with aspects of the present technique.

DETAILED DESCRIPTION

As will be described in detail hereinafter, a method for fault detection and a system for detection configured to optimize rule execution and simplify fault detection in a diagnostic imaging system, are presented. Employing the method and system described hereinafter, the system for detection may be configured to facilitate substantially faster execution of the rules in the inference engine of the rule-based system, thereby simplifying the workflow of the rule-based system and optimizing the performance of the rule-based system.

Although, the exemplary embodiments illustrated hereinafter are described in the context of a medical imaging system, it will be appreciated that use of the diagnostic system in industrial applications are also contemplated in conjunction with the present technique.

Figure 1:
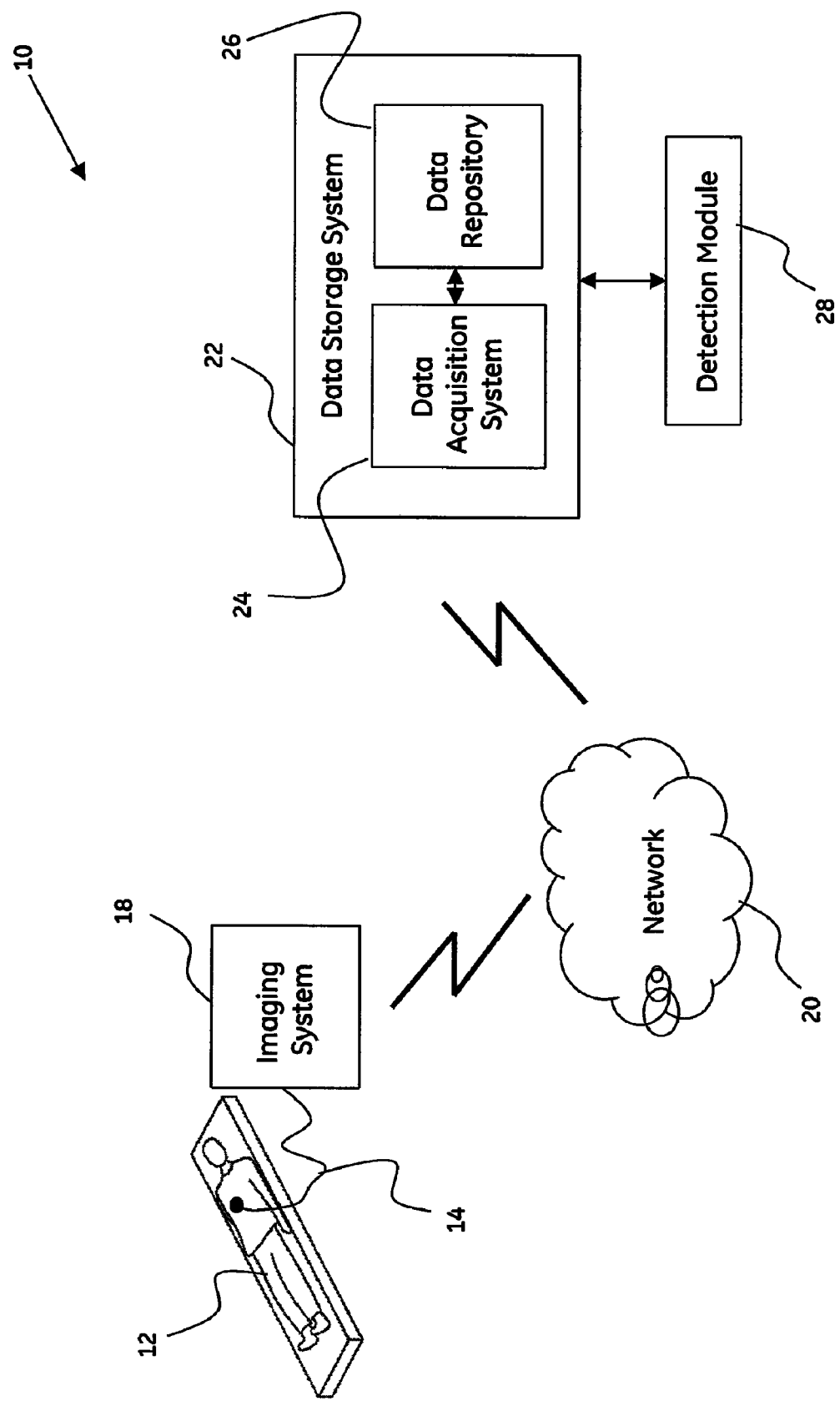
FIG. 1 is a block diagram of an exemplary diagnostic system, in accordance with aspects of the present technique.

FIG. 1 is a block diagram of an exemplary system 10 for use in diagnostic imaging in accordance with aspects of the present technique. The system 10 may be configured to acquire image data from a patient 12 via an image acquisition device 14. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the patient 12. By way of example, the sensors may include physiological sensors (not shown) such as electrocardiogram (ECG) sensors and/or positional sensors such as electromagnetic field sensors or inertial sensors. These sensors may be operationally coupled to a data acquisition device, such as an imaging system, via leads (not shown), for example.

The system 10 may also include an imaging system 18 that is in operative association with the image acquisition device 14. In a presently contemplated configuration, the imaging system 18 may include a medical imaging system. It may be noted that although the present example illustrates the diagnostic system 10 as including one imaging system 18, the diagnostic system 10 may include more than one imaging system.

It may be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Additionally, the exemplary embodiments illustrated and described hereinafter may find application in multi-modality imaging systems that employ ultrasound imaging in conjunction with other imaging modalities, position-tracking systems or other sensor systems. Furthermore, it should be noted that although the exemplary embodiments illustrated hereinafter are described in the context of a medical imaging system, such as, but not limited to, an ultrasound imaging system, an optical imaging system, a computed tomography (CT) imaging system, a magnetic resonance (MR) imaging system, an X-ray imaging system, or a positron emission tomography (PET) imaging system, other imaging systems, such as, but not limited to, a pipeline inspection system, a liquid reactor inspection system, or other imaging systems are also contemplated in accordance with aspects of the present technique.

In addition to acquiring image data, the medical imaging system 18 may also be configured to generate one or more log files. As will be appreciated, a log file may be representative of a file that lists actions that have occurred. More particularly, the log file may include functions and activities performed by the imaging system 18, often in a time-associated format, for example. Furthermore, the log file may include data representative of events, errors, machine critical parameters, sensor outputs, or a combination thereof. For example, log files generated by a medical imaging system, such as the medical imaging system 18, may include information indicative of a machine state. The machine state information may be employed to detect failures associated with the medical imaging system 18. Also, the log file may include machine-readable data.

As will be appreciated, the image data acquired via the medical imaging system 18 may be stored in a database, for example. Additionally, the log files generated by the medical imaging system 18 may be communicated to a first storage 22. In a presently contemplated configuration, the first storage 22 may include a data storage system. Also, in one embodiment, the data storage system 22 may be at a location that is physically remote from the location of the medical imaging system 18. However, as will be appreciated, in certain embodiments, the data storage system 22 may be disposed in substantially close proximity to the medical imaging system 18. Moreover, in one embodiment, the image data may be communicated to the data storage system 22 via a network 20.

Additionally, the one or more log files may also be communicated to the data storage system 22 via the network 20. It may be noted that other means of communication, such as, but not limited to, the Internet, the intranet, or wireless communication may also be employed to transmit the log files from the medical imaging system 18 to the data storage system 22. Furthermore, in one embodiment, the log files may be transmitted to the data storage system 22 in real-time. Alternatively, the log files may be temporarily stored in a temporary storage and communicated to the data storage system 22 at a later time.

Further, the data storage system 22 may include a data acquisition subsystem 24, where the data acquisition subsystem 24 may be configured to receive the log files transmitted from the medical imaging system 18 via the network 20. The log files received by the data acquisition system 24 may be stored in a data repository 26. In one embodiment, the data repository 26 may include an archival site, a database, or an optical data storage article. It may be noted that the optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format.

In accordance with exemplary aspects of the present technique, the diagnostic system 10 may also include detection module 28, where the detection module 28 may be configured to aid in proactive detection and predictive detection. The working of the detection module 28 will be explained in greater detail with reference to FIGS. 3-12.

Figure 2:
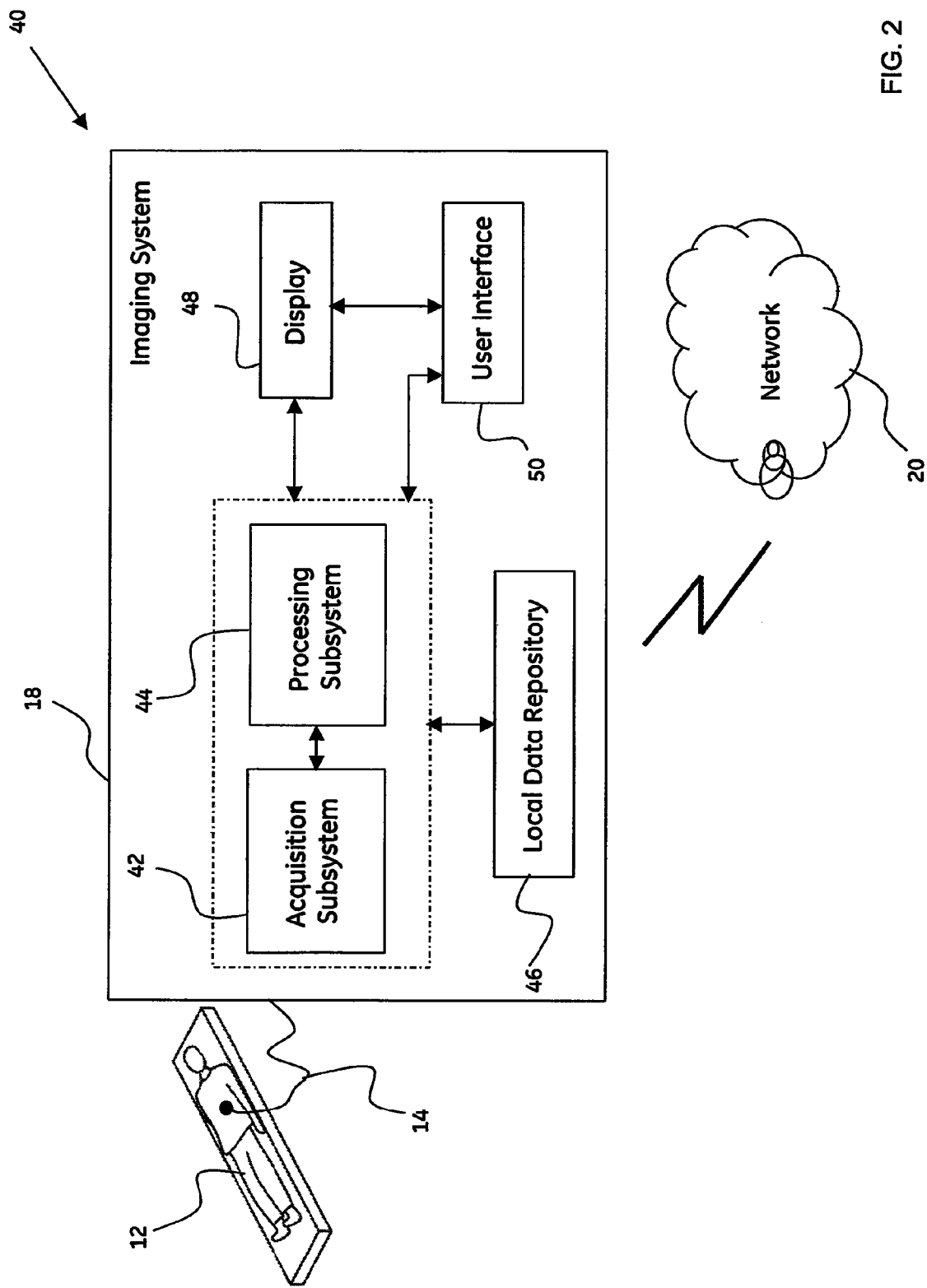
FIG. 2 is a block diagram of an imaging system in the diagnostic system of FIG. 1, in accordance with aspects of the present technique.

Turning now to FIG. 2, a block diagram 40 of the imaging system 18 (see FIG. 1) is illustrated. The imaging system 40 may be configured to acquire image data from the patient 12 (see FIG. 1) via the image acquisition device 14 (see FIG. 1), as previously noted with reference to FIG. 1. In a presently contemplated configuration, the medical imaging system 40 may include an acquisition subsystem 42 and a processing subsystem 44. Further, the acquisition subsystem 42 of the medical imaging system 40 may be configured to acquire image data representative of one or more anatomical regions of interest in the patient 12 via the image acquisition device 14. The image data acquired from the patient 12 may then be processed by the processing subsystem 44.

Additionally, the image data acquired and/or processed by the medical imaging system 40 may be employed to aid the clinician in identifying disease states, assessing need for treatment, determining suitable treatment options, and/or monitoring the effect of treatment on the disease states. In certain embodiments, the processing subsystem 44 may be further coupled to a local storage system, such as a local data repository 46, where the local data repository 46 is configured to receive image data. Furthermore, as previously noted, the medical imaging system 18 may also be configured to generate one or more log files, where the data in the log files is representative of an event, an error, a machine state, machine critical parameters, sensor outputs, or a combination thereof. In one embodiment, the processing subsystem 44 may be configured to generate the one or more log files.

Furthermore, as illustrated in FIG. 2, the medical imaging system 40 may include a display 48 and a user interface 50. However, in certain embodiments, such as in a touch screen, the display 48 and the user interface 50 may overlap. Also, in some embodiments, the display 48 and the user interface 50 may include a common area. In accordance with aspects of the present technique, the display 48 of the medical imaging system 40 may be configured to display an image generated by the medical imaging system 40 based on the image data acquired via the image acquisition device 14. Additionally, in accordance with further aspects of the present technique, information of interest retrieved from the log files may be visualized on the display 48, and will be described in greater detail with reference to FIGS. 3-12.

Further, the user interface 50 of the medical imaging system 40 may include a human interface device (not shown) configured to facilitate the clinician in organizing and/or managing image data displayed on the display 48. The human interface device may include a mouse-type device, a trackball, a joystick, a stylus, or a touch screen. However, as will be appreciated, other human interface devices, such as, but not limited to, a touch screen, may also be employed. Furthermore, in accordance with aspects of the present technique, the user interface 50 may be configured to aid the clinician in manipulating and/or organizing the information displayed on the display 48, and will be described in greater detail with reference to FIGS. 3-12.

Figure 3:
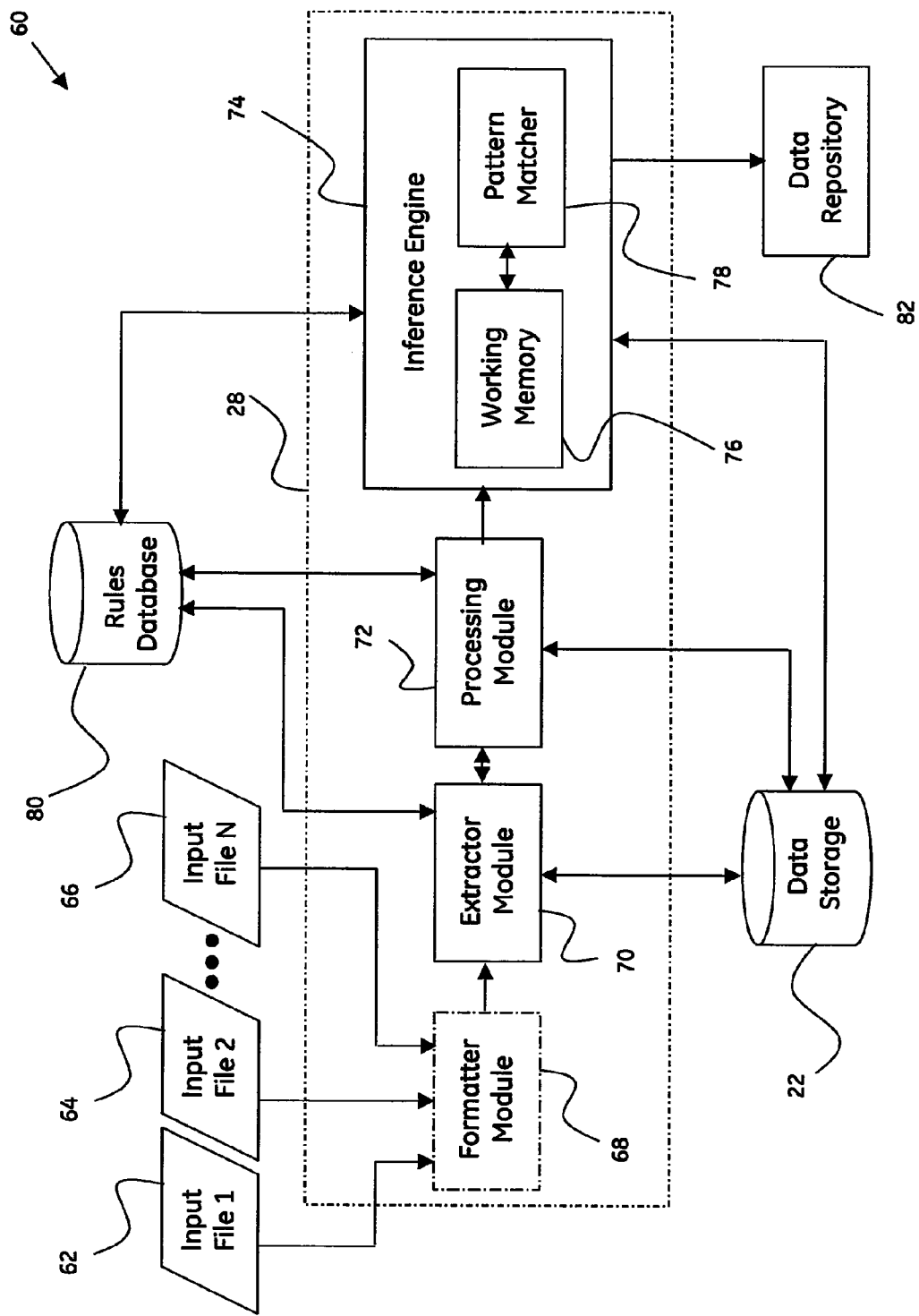
FIG. 3 is a block diagram of an exemplary rule-based system, in accordance with aspects of the present technique.

Referring now to FIG. 3, a block diagram 60 of one embodiment of a rule-based system 60 including the detection module 28 of FIG. 1 is depicted. In the example illustrated in FIG. 3, reference numerals 62, 64 and 66 are representative of a plurality of log files obtained from one or more data sources, such as imaging systems. In certain embodiments, the log files 62, 64 and 66 respectively correspond to log files obtained from different imaging modalities. Alternatively, if a single imaging modality is employed to acquire image data, then the log files 62, 64 and 66 may be representative of log files generated by the single imaging modality but stored in different formats. Although, the exemplary embodiments illustrated hereinafter are described in the context of a log file generated by a medical imaging system, it will be appreciated that use of the diagnostic system 10 (see FIG. 1) in analyzing machine readable data generated by different data sources are also contemplated in conjunction with the present technique.

As previously noted with reference to FIG. 1, the detection module 28 (see FIG. 1) of the diagnostic system 10 (see FIG. 1) is configured to aid in the analysis of the log file, for example. Accordingly, the one or more log files 62, 64, 66 may be processed by the detection module 28. In one embodiment, the detection module 28 may include an extractor module 70, a processing module 72, and an interpreter module 74. Additionally, in certain embodiments, the detection module 28 may also include a formatter module 68. The working of the formatter module 68, the extractor module 70, the processing module 72, and the interpreter module 74 will be described in greater detail hereinafter.

In accordance with aspects of the present technique, the formatter module 68 may be configured to format the data in the input files 62, 64, 66. More particularly, the formatter module 68 may be configured to convert the data from a native format to a common format. The term native format is representative of a format that a system typically employs to log data. Also, the term common format is indicative of a standard format that aids in simplifying the process of identifying and extracting parametric data points. For example, the medical imaging system 18 may log the data into the input file 62 in a native format, where the native format may include a text format. The formatter module 68 may be configured to convert the native text format of the data in the input file 62 to a common format. Further, in one embodiment, the machine data in the input file 62 may be categorized into three types of common data format, namely, the parametric log format, the error event log format, and the system tracker log format. Accordingly, converting the format of the data in the input files to a common format simplifies the process of identifying and extracting information of interest from the log data downstream.

Additionally, in accordance with further aspects of the present technique, the extractor module 70 may be configured to extract information of interest from the input log file, such as log file 62, for example. More particularly, in accordance with exemplary aspects of the present technique, the extractor module 70 may be configured to extract information of interest from the log file 62 based upon one or more predefined rules.

The predefined rules may be stored in a second storage 80, in one embodiment. In a presently contemplated configuration, the second storage 80 may include a rules database that is configured to store the predefined rules. An example of a set of predefined rules that is stored in the rules database 80 will be described in greater detail with reference to FIG. 9. As used herein, the term "rule" may be used to refer to a predefined constraint that typically encompass any and all actions that should be taken within the scope of a problem. These rules may be collectively referred to a rule base, where the rule base may contain all of the knowledge associated with the rule-based system. The rules may be typically encoded into IF-THEN rules. As will be appreciated, a rule-based system may examine all the rule conditions (IF) and determine a subset, the conflict set, of the rules whose conditions are satisfied based on a working memory, where the working memory may include any data, assertions or initially known information. Subsequently, one of the rules chosen from the conflict set based on a conflict resolution strategy may be triggered. Following the triggering of a rule, any actions specified in the corresponding THEN clause may be carried out. These actions may modify the working memory, the rule-base, or execute any actions specified by the THEN clause. Moreover, one form of the rule is a business rule. A business rule may be configured to define and/or constrain an aspect of a business. Further, the business rule may be specified in formats different from the IF-THEN format.

Also, in accordance with aspects of the present technique, the predefined rules may be representative of information associated with the status of a system, such as the medical imaging system 18 (see FIG. 1). For example, the predefined rules may be employed to aid in detecting system status or health of the medical imaging system 18. Also, a predefined set of parameters may be associated with a given imaging modality, where the imaging modality may include an imaging system, such as, but not limited to, an ultrasound system, an X-ray system, a MR imaging system, a CT imaging system, or a combination thereof. For example, the predefined rules may include a set of parameters associated with a CT imaging system, where the parameters may include a speed, a temperature, a pressure, number of disks, or percentage of disk usage. Additionally, the predefined rules may also include one or more indicators, where the indicators may be associated with one or more parameters. For example, an indicator associated with a temperature parameter may include an average of the temperature parameter recorded during a predetermined interval. Accordingly, for a given imaging modality, the predefined rules may include one or more rules based on various combinations of the associated parameters and/or indicators. Furthermore, a set of rules may be defined for each of the imaging modalities, where the rules may include parameter-based rules and/or indicator-based rules. Additionally, the predefined rules may also include other expressions to be extracted from the log file, where the expressions may be representative of error codes generated by the imaging system 18, for example. It may be noted that the terms expressions to be extracted and tokens may be used interchangeably.

As noted hereinabove, the extractor module 70 may be configured to search data in the log file 62 for matching information of interest and extract the information of interest from the log file 62. In one embodiment, the information of interest to be extracted may include one or more parameters, one or more indicators, one or more error codes, or combinations thereof. Additionally, the information of interest may be employed to detect status and/or health of the medical imaging system 18, for instance. The information of interest may also be used for predictive detection and/or proactive detection.

Furthermore, the predefined rules may be stored in the rules database 80, as previously noted. The extractor module 70 may be configured to query the rules database 80 to obtain the one or more predefined rules. In addition, the extractor module 70 may be configured to query the rules database 80 to obtain data associated with the information of interest to be extracted. In a presently contemplated configuration, data associated with the information of interest to be extracted may be stored in a separate file, such as the information of interest file (see FIG. 10). Also, in one embodiment, the information of interest file may be stored in the data storage system 22, for instance. The extractor module 70 may be further configured to parse through the data in the log file 62 to extract the information of interest based upon the information of interest file and the predefined rules. Techniques, such as, but not limited to, standard file reading techniques, regular expression techniques, or transformation techniques may be employed by the extractor module 70 to parse through the log file 62 to extract the information of interest.

As will be appreciated, the log file 62 may include a substantial amount of data. For example, a log file may typically have a size in a range from about 100 kilobytes to about 100 megabytes. The extractor module 70 may thus be configured to parse through a large amount of data in the log file 62 and extract only the information of interest indicated in the information of interest file and the predefined rules. The extractor module 70 may search through the log file 62 for matches based on the information of interest to be extracted. In certain embodiments, the extractor module 70 may be configured to search for an exact match of the information of interest to be extracted. However, a near match of the information of interest may also be extracted from the log file 62. Furthermore, the extractor module 70 may also be configured to apply proximity matching techniques to extract the information of interest from the log file 62.

Subsequent to processing by the extractor module 70, the information of interest may be extracted based on the predefined rules. According to aspects of the present technique, the extracted information of interest may be saved in the data storage system 22 (see FIG. 1). Alternatively, the extracted information of interest may be saved in an output file configured to only include the information of interest that has been extracted from the log file 62. As noted hereinabove, the information of interest to be extracted may include the parameters, indicators, and/or error codes listed in the predefined rules. Consequently, the extracted data may include information associated with the parameters, indicators, and/or error codes. The working of the extractor module 70 will be described in greater detail with reference to FIGS. 4-12.

By implementing the extractor module 70 as described hereinabove, the size of the data to be processed downstream is substantially reduced as non-pertinent information is filtered out from the log file based on the predefined rules. In other words, only relevant information of interest is extracted from the log file for further processing downstream, thereby enhancing the efficiency and speed of the rule-based system.

Furthermore, in accordance with exemplary aspects of the present technique, the processing module 72 may be configured to process the extracted information of interest in light of the predefined rules stored in the rules database 80. Although the working of the processing module 72 is described in terms of the extracted data, it may be noted that the processing module 72 may also be configured to process the log data stored in data storage system 22, for example. The working of the processing module 72 will be described in greater detail with reference to FIG. 4.

The data processed by the processing module 72 may then be communicated to an interpreter module 74. In a presently contemplated embodiment, the interpreter module 74 may include an inference engine. As will be appreciated, an inference engine may be defined as a computer program that is configured to derive answers from a knowledge base. The inference engine 74 may be referred to as the "brain" that expert systems use to reason about the information in the knowledge base for the ultimate purpose of formulating new conclusions.

In one embodiment, the inference engine 74 may include a working memory 76 and a pattern matcher 78. The working memory 76 may be defined as a workspace including a small set of data items representing the current state of knowledge of a system, such as the medical imaging system 18 (see FIG. 1), at any stage in the performance of a task, and where the knowledge of the system is transformed into a new set on the firing of a new rule. The working memory 76 may be configured to serve as a global database of symbols representing facts or assertions about a given problem.

Further, the inference engine 74 may be described as a form of finite state machine with a cycle consisting of three action states: match rules, select rules, and execute rules, where the rules may include the predefined rules obtained from the rules database 80. In the first state, match rules, the inference engine 74 may be configured to find all of the rules that are satisfied by the current contents of the working memory 76. Moreover, the rules are generally in a condition-action form. Consequently, the conditions may be tested against the working memory 76. The pattern matcher 78 may be utilized to test the conditions against the working memory 76, in certain embodiments. Also, the rule matchings that may be found are all candidates for execution and may be collectively referred to as a conflict set, as previously noted. It may be noted that a particular rule may appear several times in the conflict set if that rule matches different subsets of data items. The pair of a rule and a subset of matching data items may be generally referred to as an instantiation of the rule.

With continuing reference to FIG. 3, the inference engine 74 may be configured to pass along the conflict set to the second state, select rules. In the select rules state, the inference engine 74 may be configured to apply a selection strategy to determine which rules will actually be executed. The selection strategy may be hard-coded into the inference engine 74 or may be specified as part of the model. Finally, the selected instantiations may be passed over to the third state, execute rules. The inference engine 74 may be configured to execute or fire the selected rules with the data items associated with the rule instantiation as parameters.

The inference engine 74 may then be configured to cycle back to the first state and start over again. This control mechanism is generally referred to as the recognize-act cycle. Also, the inference engine 74 may be configured to stop either on a given number of cycles, controlled by the operator, or on a quiescent state of the data when no rules match the data. Subsequently, the inference engine 74 may be configured to determine which rules are relevant to a given data configuration and choose which one to apply. The control strategy used to select rules is generally referred to as conflict resolution.

As noted hereinabove, the inference engine 74 may be configured to find all of the rules that are satisfied by the current contents of the working memory 76 by testing the conditions against the working memory 76. Furthermore, the computation of the conflict set may result in a non-trivial problem, especially while handling a large volume of data and/or when the rules include complex calculations. More particularly, complex rules entail testing and retesting conditions for each rule against all the supplied facts, thereby resulting in a time-consuming and cumbersome process. In accordance with exemplary aspects of the present technique, the number of facts presented to the inference engine 74 to be tested against the conditions of each rule may be substantially reduced by pre-computing the facts outside the scope of the inference engine 74, thereby dramatically improving the performance of the inference engine 74.

Figure 4:
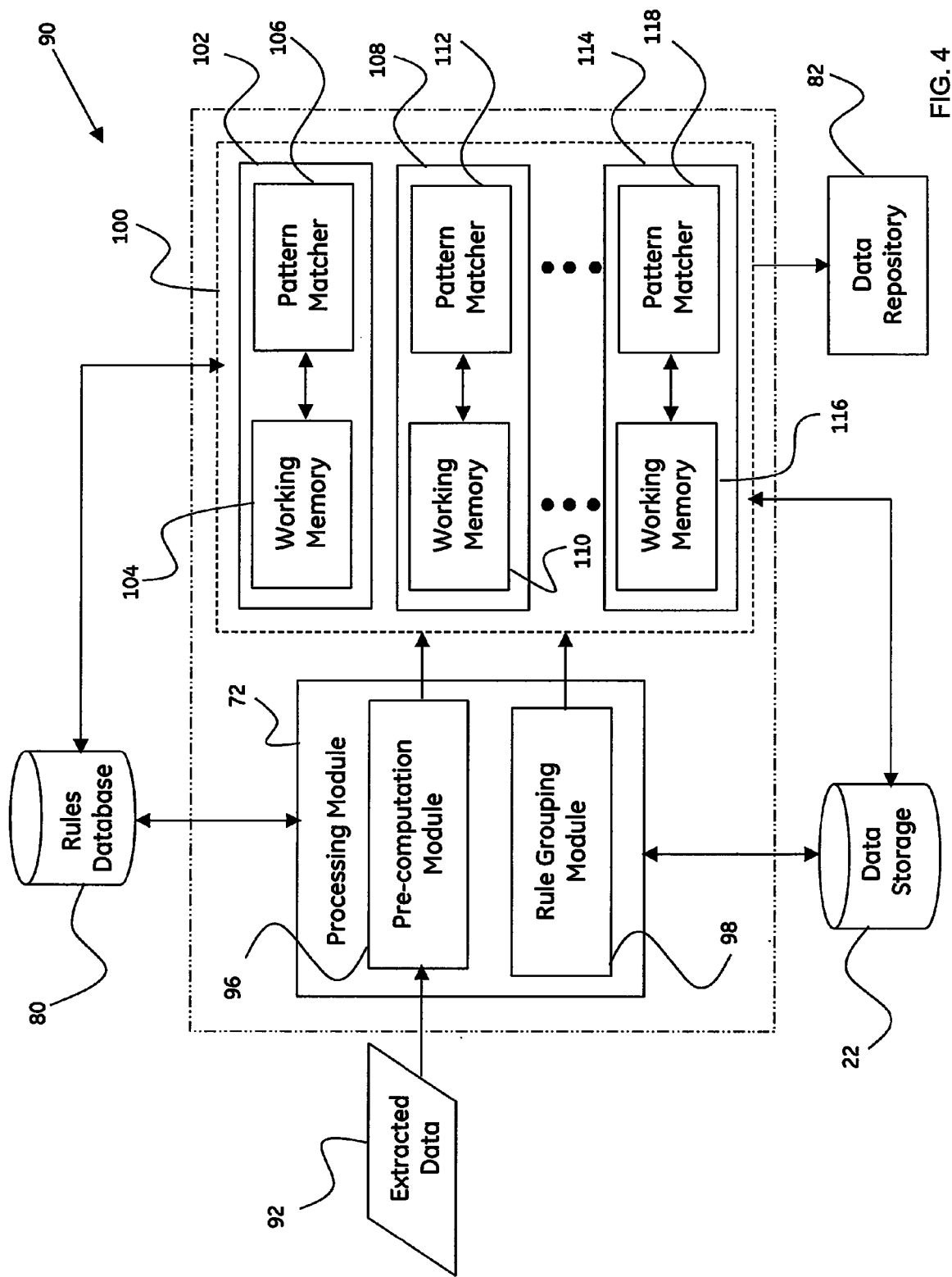
FIG. 4 is a block diagram of a portion of the exemplary rule-based system of FIG. 3, in accordance with aspects of the present technique.

Accordingly, the processing module 72 may be configured to pre-process the extracted data in light of the predefined rules. The working of the processing module 72 may be better understood with reference to FIG. 4. Referring now to FIG. 4, one embodiment of a portion 90 of the rule-based system 60 of FIG. 3 is illustrated. Reference numeral 92 is representative of extracted data generated by the extractor module 70 (see FIG. 3). As depicted in FIG. 4, the processing module 72 may include a pre-computation module 96, in one embodiment. The pre-computation module 96 may be configured to aid in enhancing the performance of the rule-based system 60 by pre-calculating any computations of the extracted data as specified by the predefined rules outside the scope of the inference engine 74 (see FIG. 3). The working of the pre-computation module 96 may be better understood with reference to the following example. For example, a predefined rule may include a condition such as:

$$D > X \text{ units},$$

$$\text{where } D = \text{Average}(B), \tag{1}$$

If B includes 100 or more facts in the working memory 76 (see FIG. 3), use of the presently available techniques entails laborious computation of the average D of each of the 100 or more facts of B, thereby resulting in diminished performance of inference engine 74 in the rule-based system 60. However, employing the technique presented hereinabove, the computation of the average D may be performed outside the scope of the inference engine 74. In other words, the average D of the 100 or more facts of B may be computed via the pre-computation module 96. Subsequently, this pre-computed result D may be passed as a fact for the inference engine 74 for further processing.

By implementing the pre-computation module 96 as described hereinabove, any calculations associated with the extracted data set defined in the predefined rules may be pre-computed outside the scope of the inference engine 74 and the pre-computed result may be passed as a fact to the inference engine 74, thereby advantageously resulting in faster execution and substantially fewer memory allocations as the working memory 76 is now configured to operate with a substantially smaller number of facts representative of the extracted data. In addition, the complexity of the rule logic handled by the inference engine 74 is dramatically simplified as the inference engine 74 is now configured to work with indicators that are representative of the extracted data set.

Additionally, in accordance with further aspects of the present technique, the extracted data may also be categorized into one or more rule groups based on a rule condition affinity. These rule groups may then be separately and simultaneously processed by a corresponding inference engine. More particularly, once the rule groups are formed, the processing module 72 may be configured to instantiate a number of inference engines, where the number of instances of inference engines may be configured to correspond to the number of rule groups. This rule grouping based on the rule condition affinity may be better understood with the aid of the following example having the following set of business rules:

Rule1 (R1):
when $$A > X \ \&\& \ B > Y$$

then $$\text{condition 1} \tag{2}$$

Rule2 (R2):
when $$C > W$$

then $$\text{condition 2} \tag{3}$$

Rule3 (R3):
when $$A > W \ \&\& \ D > Y$$

then $$\text{condition 3} \tag{4}$$

where parameters A, B, C and D may be defined as including:

$$A \to 500 \text{ data points}$$
$$B \to 100 \text{ data points}$$
$$C \to 500 \text{ data points}$$
$$D \to 1000 \text{ data points.} \quad (5)$$

In accordance with exemplary aspects of the present technique, the processing module 72 may also include a rule grouping module 98, in certain embodiments. The rule grouping module 98 may be configured to group the rules in the rules database 80 into one or more rule groups based on a rule condition affinity. Employing the currently available techniques, rule execution in the inference engine involves an existence test in connection with the conditions in the rule. More particularly, the currently available techniques typically employ one inference engine. Hence, in the present example depicted in equations (2)-(5), the single inference engine having the business rules R1, R2 and R3 respectively in the working memory performs the existence tests of rule condition "C" of R2 against all the facts of the other rules R1 and R3. Unfortunately, this use of a single inference engine results in a degraded performance of the rule-based system as the rule condition "C" has to be checked against 1600 data points of A, B and D of rules R1 and R3.

The degraded performance of such a system may be advantageously enhanced by grouping rules that have a rule condition affinity, in accordance with exemplary aspects of the present technique. In one embodiment, the grouping of rules may be based on a number of data points or facts, number of rules, number of similar rule conditions, or a combination thereof. Using the example presented in equations (2)-(5), it may be noted that parameter "A" is common between rules R1 and R3. Accordingly, rules R1 and R3 may be grouped together in a first rule group, while rule R2 may be included in a second rule group.

Subsequently, in accordance with exemplary aspects of the present technique, the processing module 72 may be configured to instantiate one or more inference engines depending on the number of rule groups. In the present example, the processing module 72 may be configured to instantiate two instances of the inference engine, where a first inference engine may be configured to process the first rule group having rules R1 and R3, while the second rule group having rule R2 may be processed by a second inference engine. It may be noted that with this grouping of rules, the number of inference engines in the rule-based system may be substantially equivalent to the number of rule groups.

By implementing the rule grouping module 98 as described hereinabove, performance of the rule-based system 60 may be dramatically enhanced as each of the inference engine is now configured to process a relatively smaller data set. Furthermore, the speed of the rule-based system 60 may be increased as the instances of the inference engines may be configured to run simultaneously.

With continuing reference to FIG. 4, reference numeral 100 may be representative of a number of instances of inference engines in the rule-based system 60. The illustrated example of FIG. 4 shows N instances of inference engines. A first inference engine is represented by reference numeral 102, where the first inference engine 102 may be configured to have a first working memory 104 and a first pattern matcher 106. In a similar fashion, a second inference engine 108 may include a second working memory 110 and a second pattern matcher 112. Reference numeral 114 is generally indicative of an Nth inference engine, where the Nth inference engine 114 is shown as including an Nth working memory 116 and an Nth pattern matcher 118.

Here again, using the example illustrated in equations (2)-(5), it may be noted that only the first inference engine 102 and the second inference engine 108 may be instantiated by the processing module 72. Subsequently, the first rule group having rules R1 and R3 may be processed via the first inference engine 102, while the second inference engine 108 may be utilized to process the second rule group having the rule R2. Furthermore, output data generated consequent to processing by a corresponding inference engine may be stored in a third storage, such as a data repository 82. However, the output data may also be stored in the data storage system 22.

Figure 5A:
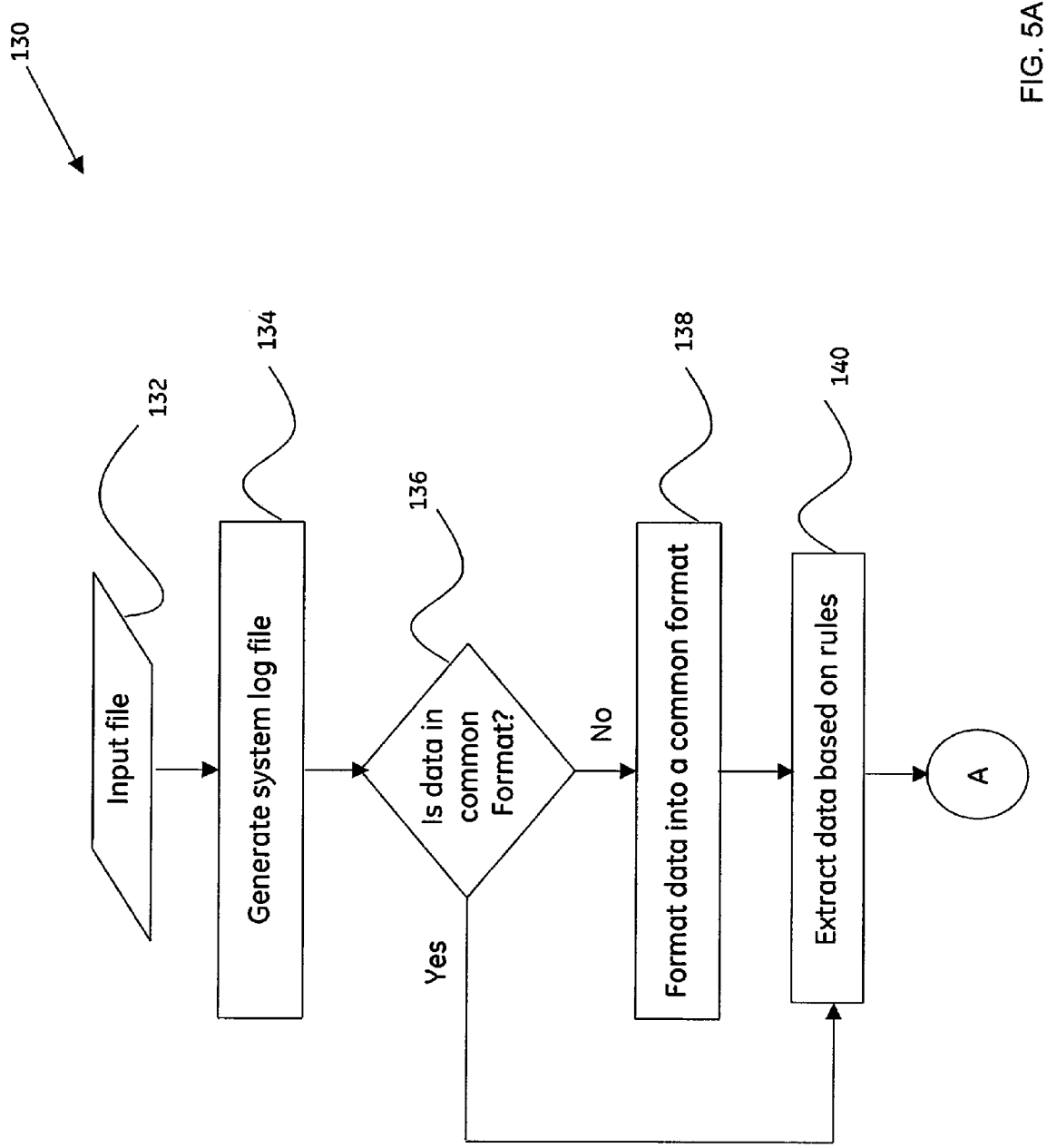
FIGS. 5A and 5B are flow charts illustrating an exemplary process for fault detection, in accordance with aspects of the present technique.
Figure 5B:
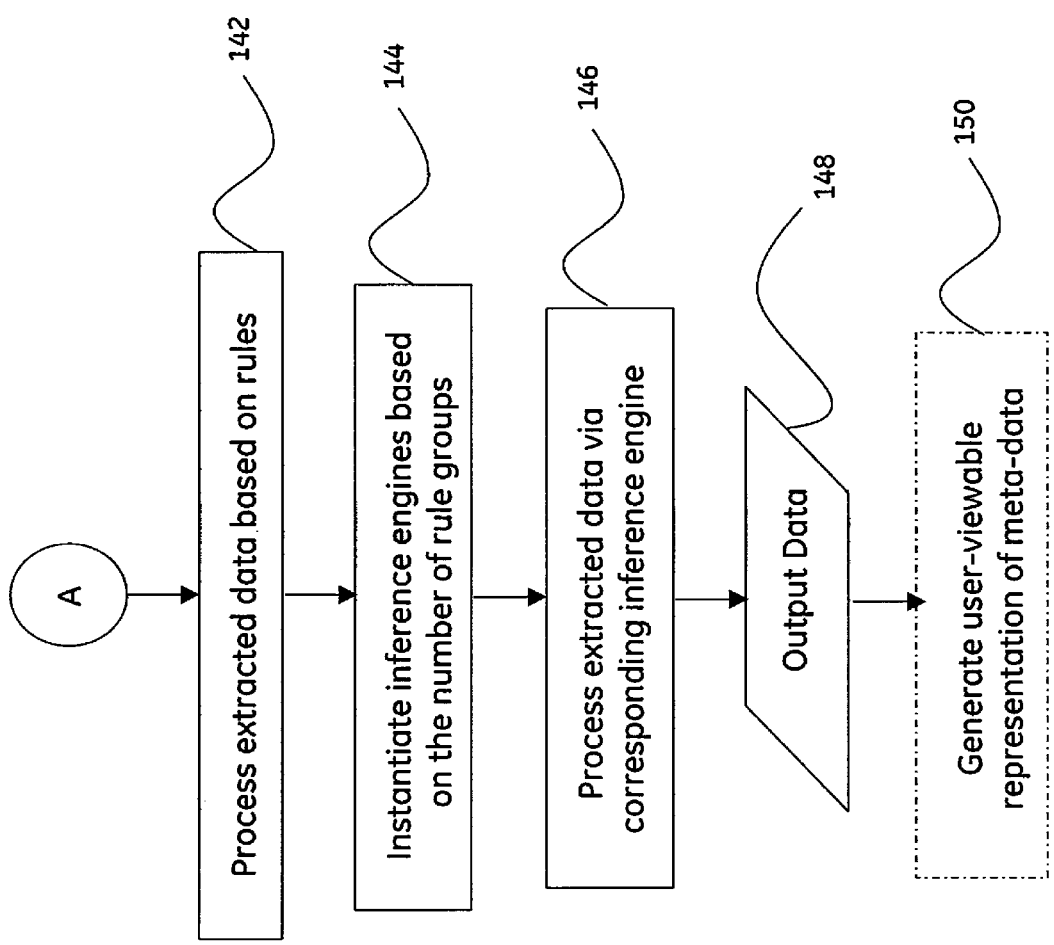

As previously noted, the detection module 28 (see FIG. 1) may be configured to aid in the proactive and predictive detection of the health of a system, such as the medical imaging system 18 (see FIG. 1). The working of the detection module 28 (see FIG. 1) may be better understood with reference to the exemplary logic depicted in FIGS. 5-12. Referring now to FIGS. 5A-5B, flow charts of exemplary logic 130 for detection are illustrated. In accordance with exemplary aspects of the present technique, a method for processing data based on predefined rules is presented.

Figure 8:
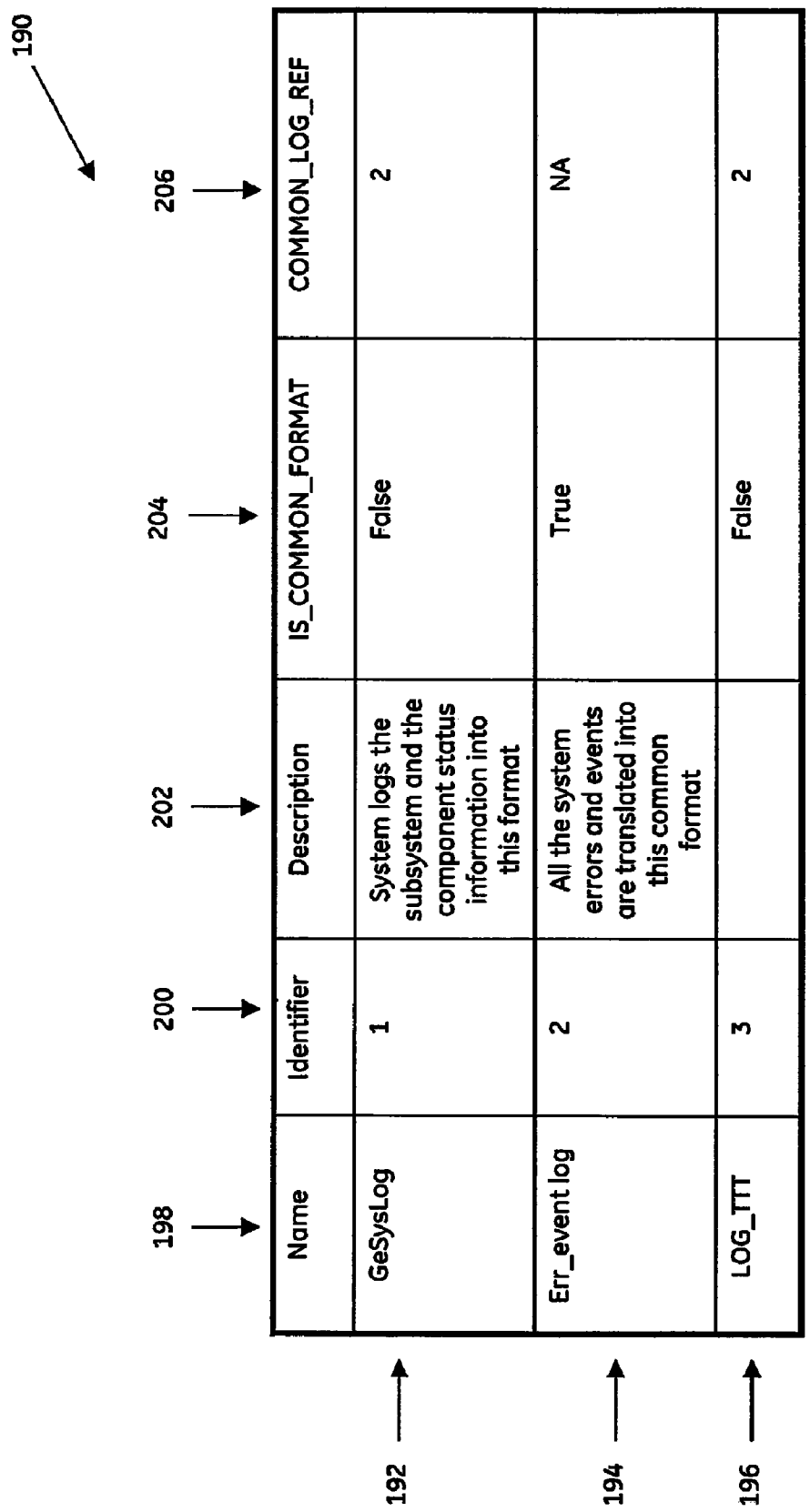
FIG. 8 is a diagrammatic illustration of a system log file, in accordance with aspects of the present technique.

The method starts at step 134, where on receiving a log file, such as the input file 132, a system log file configured to store relevant information associated with the input log file may be generated. In one embodiment, the data storage system 22 may be configured to generate the system log file and store the relevant information associated with the input log file in the system log file. Step 134 may be better understood with reference to FIG. 8. Turning now to FIG. 8, an example 190 of a system log file, in accordance with aspects of the present technique, is depicted. The system log file 190 may be generated when the rule-based system receives a log file, such as input file 132 (see FIG. 5) for processing. In the illustrated example, the system log file 190 is depicted as including information associated with three log files, including a first log file (GeSysLog) 192, a second log file (Err_event log) 194 and a third log file (LOG_TTT) 196. Further, in one embodiment, the three log files 192, 194, 196 may be representative of log files generated by the same medical imaging system. Alternatively, the three log files 192, 194, 196 may represent log files generated by three different medical imaging systems, for example.

Reference numeral 198 is representative of a name of the input log file, while an identification number of the input log file may be generally represented by reference numeral 200. Additionally, a description of the input log file may be indicated by reference numeral 202. Further, reference numeral 204 may be representative of a format of the input log file. In one embodiment, a Boolean expression "IS_COMMON_FORMAT" may be employed to indicate if the data in the input log file is in conformance with a common data format. The common data format may include a parametric log format, an error event log format, or a system tracker log format, as previously noted.

Further, in order to simplify the process of identifying and extracting parametric data points, it is desirable to convert the data in an input file to a common format, as previously noted. Accordingly, a check may be carried out at step 136 to verify if the data in an input log file 132 is in a common format. If it is determined that the data in the input log file 132 is not in a common format, then the data may be converted to conform to a common format, as indicated by step 138. However, if at decision block 136 it is verified that the data in the input log file 132 is in conformance with a common format, then step 138 may be skipped. Steps 136-138 may be better understood with reference to the system log file 190 of FIG. 8.

Referring again to FIG. 8, in accordance with aspects of the present technique, if the data in the input log file 132 is in a common data format, then the data may be passed on for further processing downstream. However, if the data in the input log file 132 is not in a common data format, then the data may be converted to a common data format. For example, referring to the system log file 190 in FIG. 8, if the input log file 132 includes the Err_event log file 194, it may be noted that the input log file 132 includes data that is in conformance with the common data format as indicated by the "IS_COMMON_FORMAT" expression 204. However, in the illustrated example, if the input log file 132 includes the GeSys-Log file 192 and/or the LOG_TTT log file 196, it may be noted that the data in the log files 192, 196 include data that is not in the common format as indicated by the "IS_COMMON_FORMAT" expression 204. Accordingly, the data in the input log files 192, 196 may be converted to the common data format as specified by a corresponding "COMMON_LOG_REF" expression 206. In the present example, the "COMMON_LOG_REF" has a value of "2" associated with both the GeSysLog file 192 and LOG_TTT file 196, where "2" is representative of the identifier of the Err-event log file 194. Accordingly, the data in the input log files 192, 196 may be converted to data having a format substantially similar to the data in the Err_event log file 194.

With returning reference to FIG. 5, consequent to step 138, the data in the input file 132 may be configured to be in a predefined common format. As described hereinabove, employing the system log file 190 (see FIG. 8), a check may be carried out, at step 136, to verify if the data in the input log file 132 is in a common data format by checking the "IS_COMMON_FORMAT" expression 204 (see FIG. 8) of the system log file 190. If the data is in conformance with the common data format, then the data may be passed on to the subsequent processing steps. However, if the data in the input file 132 is not presented in a common data format, then the data in the input file 132 may be converted to a common data format indicated by the "COMMON_LOG_REF" expression 206 (see FIG. 8), at step 138.

Subsequently, at step 140, the data in an input log file 132 may be parsed based upon one or more predefined rules. Although the present embodiment is described in terms of the data source including a previously stored file, such as a log file, it will be appreciated that step 140 may also be configured to process a real-time data stream. Additionally, the data in the input log file 132 may include machine-readable date, as previously noted.

In accordance with exemplary aspects of the present technique, the data in the input log file 132 may be parsed based on one or more predefined rules. In other words, information of interest may be extracted from the input file 132 based upon the predefined rules. More particularly, an information of interest file may be generated based on the predefined rules, where the information of interest file may be configured to include information associated with parameters to be extracted and/or indicators to be computed. The information of interest file may be stored in the data storage system 22 (see FIG. 1), in one embodiment. Step 140 that entails the extraction of the data in the input log file 132 may be better understood with reference to FIG. 6. A flow chart of exemplary logic for performing step 140 (see FIG. 5), where step 140 includes extracting data from the input log file 132 based on the predefined rules is illustrated. As previously noted, the predefined rules are stored in the rules database 80 (see FIG. 3). Accordingly, step 140 may entail retrieval of the predefined rules from the rules database 80, as depicted in step 152. In other words, the rules database 80 may be queried to obtain the predefined rules.

An example 220 of predefined rules stored in the rules database 80 (see FIG. 3) for use in the diagnostic system 10 (see FIG. 1) is illustrated in FIG. 9. In the illustrated example, the sample database 220 is shown as including six rules. More particularly, the sample rules database 220 is shown as including a first rule Rule1 222, a second rule Rule2 224, a third rule Rule3 226, a fourth rule Rule4 228, a fifth rule Rule5 230, and a sixth rule Rule6 232. Reference numeral 234 may be representative of a rule name, while an identifier associated with a corresponding rule may be indicated by reference numeral 236. Furthermore, a description associated with a corresponding rule may generally be represented by reference numeral 238. In addition, a source of the rule may be represented by reference numeral 240. The source 240 may include the definition of the rule, in one embodiment. Also, a type of system where the rule may find application may be represented by reference numeral 242. In the present example, Rule1 222, Rule5 230 and Rule6 232 may find application in both the CT/HELIOS system and the CT/LIGHTSPEED system, while Rule2 224, Rule3 226 and Rule4 228 may be applied to only the CT/HELIOS system.

With returning reference to FIG. 6, data may be extracted from the input file 132 based on the rules obtained from the rules database 80. More particularly, information of interest may be extracted from the data in the input file 132, where the information of interest may be deduced from the rules in the rules database 80. The information of interest may include one or more parameters, one or more indicators, or combinations thereof, as previously noted. In accordance with aspects of the present technique, the information of interest may be obtained from the rules in the rules database 80. For example, referring again to FIG. 9, it may be inferred that information of interest may include parameters "A", "B", "C", "D", "H", "I", and "J" and indicators "E", "F", and "G".

In accordance with aspects of the present technique, at step 154, a table may be generated to include the information of interest to be extracted from the input file 132, where the information of interest is obtained from the predefined rules stored in the rules database 80. An example table 250 of information of interest to be extracted from the input file 132 is illustrated in FIG. 10. It may be noted that the information of interest table 250 may be stored in the data storage system 22, in one embodiment. In the illustrated example, the information of interest table 250 is depicted as including ten (10) variables 252, where the variables may include "A", "B", "C", "D", "E", "F", "G", "H", "I", and "J" obtained from the rules 222-232 of FIG. 9. It may be noted that the variables 252 may be representative of parameters to be extracted from the input file 132 or indicators to be computed. In addition, reference numeral 254 is representative of names of the variables 252, while reference numeral 256 is representative of identifiers associated with the variables 252. Further, a description of the variables 252 may be generally represented by reference numeral 258.

Moreover, reference numeral 260 may be indicative of a type of log file associated with the variables 252. The type of log file may be represented by an expression LOG_TYPE_REF. In other words, LOG_TYPE_REF may be representative of a type of log file listed in the system log file 190 (see FIG. 8). For example, if a variable 252, such as "A", has a LOG_TYPE_REF 260 of "1", then the variable "A" may be extracted from the GeSysLog file 192 (see FIG. 8) having an identifier of "1". In a similar fashion, if a variable 252, such as "H", has a LOG_TYPE_REF 260 of "3", then the variable "H" may be extracted from the LOG_TTT file 196 (see FIG. 8) having an identifier of "3".

Furthermore, reference numeral 262 may be indicative of a type of variable 252. An expression PARAM_TYPE may be representative of the type of variable 252. More particularly, a value in the "PARAM_TYPE" expression 262 may be employed to indicate if a given variable 252 is a parameter or an indicator. For example, in the illustrated example, variables "A", "B", "C", "D", "H", "I", and "J" are depicted as being of a "PARAMETER" type. Accordingly, the variables "A", "B", "C", "D", "H", "I", and "J" may be directly extracted from the input file 132. Additionally, the variables "E", "F", and "G" are depicted as an "INDICATOR" type. Hence, these indicator variables "E", "F", and "G" may be computed based upon a corresponding description 258. In the present example, the variables "E", "F", and "G" may be computed as:

$$E = \text{FREQ\_COUNT}(C), \quad (6)$$

$$F = \text{MAX}(D), \quad (7)$$

$$\text{and } G = \text{MAX}(A). \quad (8)$$

Figure 11:
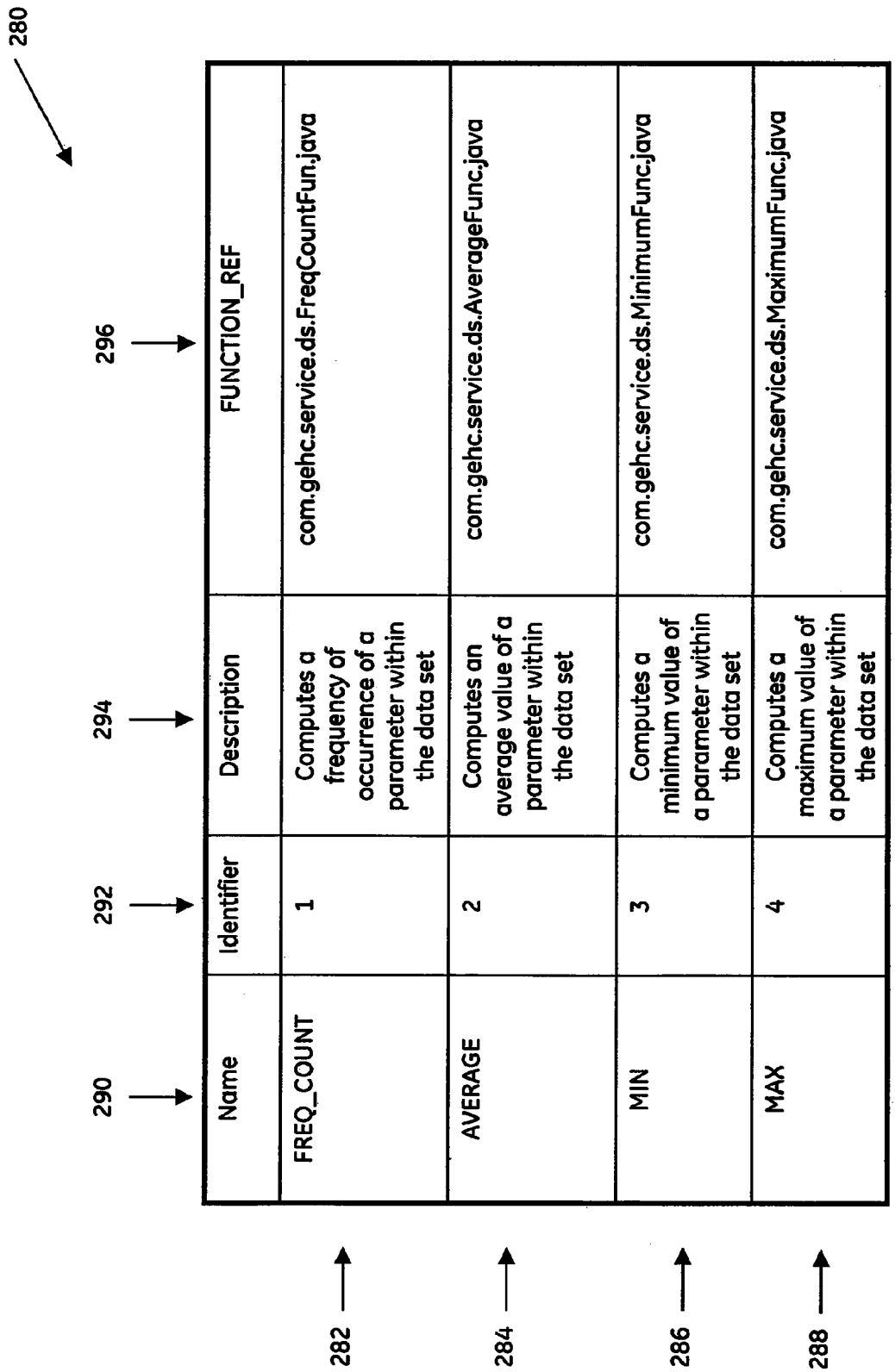
FIG. 11 is a diagrammatic illustration of a predefined functions table, in accordance with aspects of the present technique.

Information related to functions associated with the indicator variables "E", "F", and "G", such as FREQ_COUNT and MAX may be obtained from a predefined functions table, for example. An example 280 of a predefined functions table is illustrated in FIG. 11. Reference numeral 282, 284, 286, and 288 may be representative of mathematical functions, for example. In the illustrated example, reference numeral 282 is representative of a FREQ_COUNT function, while an AVERAGE function may be generally represented by reference numeral 284. Similarly, a MIN function may be depicted by reference numeral 286, while reference numeral 288 may be representative of a MAX function.

Furthermore, reference numeral 290 is indicative of a name of the mathematical function, while an identifier associated with the mathematical function may be represented by reference numeral 292. Additionally, a description associated with a given mathematical function may be represented by reference numeral 294, while a corresponding function that may be called may generally be represented by reference numeral 296. It may be noted that "FUNCTION_REF" 296 may include a name of an associated function that may be called. Although, the present example of the predefined functions table 280 is illustrated as including mathematical functions, it may be noted that other expressions are also contemplated in conjunction with the present technique.

With returning reference to FIG. 10, reference numeral 264 may be indicative of a pre-processing function associated with a given indicator. More particularly, a "PREPROCES-SOR_REF" value 264 may be associated with an indicator variable, such as indicator variables "E", "F", and "C". In the present example, the indicator variable "E" is depicted as having a "PREPROCESSOR_REF" value of "1", which is indicative of the mathematical function FREQ_COUNT 282 (see FIG. 11) having an identifier of "1" in the preprocessor table 280 (see FIG. 11). In a similar fashion, the indicator variables "F" and "G" are depicted as having a "PREPRO-CESSOR_REF" value of "4", which is representative of the mathematical function MAX 288 having an identifier of "4" in the preprocessor table 280 (see FIG. 11).

Additionally, reference numeral 266 is representative of a data type associated with the variable 252. As previously noted, the indicators "E", "F", and "G" are associated with one or more parameter variables. Accordingly, parameters associated with a corresponding indicator may be represented by reference numeral 268. For example, the indicator "E" is shown as having an ASSOCIATED_PARAMS value of "3", which is indicative of the third parameter "C" in the information of interest table 250. Similarly, the indicator "F" is configured to operate on the fourth parameter "D" in the information of interest table 250, while the indicator "G" is configured to operate on the first parameter "A" in the information of interest table 250.

Referring again to FIG. 6, and more particularly to step 156, information of interest may be extracted from the input file 132 based on the rules obtained from the rules database 80, as previously described. As described hereinabove, the data associated with the information of interest may be obtained from an information of interest table, such as table 250 (see FIG. 10). In the example illustrated in the table 250, variables "A", "B", "C", "D", "H", "I", and "J" may be directly extracted from the input file 132. Accordingly, consequent to step 156, extracted data 158 may be generated, where the extracted data 158 may be representative of data extracted from the input file 132 based on the information of interest obtained from the information of interest table 250. Techniques, such as, but not limited to, standard file reading techniques, regular expression techniques, or transformation techniques may be employed by the extractor module 70 to parse through the log file 62 to extract the information of interest, as previously noted.

With returning reference to FIG. 5, the extracted data 158 (see FIG. 6) generated at step 156 (see FIG. 6) may be processed at step 142. As previously described with reference to FIG. 4, the processing step 142 may include a pre-computation step and a rule grouping step. Step 142, which entails the processing of the extracted data 158, may be better understood with reference to FIG. 7. A flow chart of exemplary logic for performing step 142 (see FIG. 5), where step 142 includes processing the extracted data 158 based on the predefined rules is illustrated. Although the processing step 142 is described as processing the extracted data 158, it may be noted that the processing step 142 may also be applied to the log data stored in the data storage system 22 (see FIG. 3), in accordance with aspects of the present technique. As previously noted, the predefined rules are stored in the rules database 80 (see FIG. 3). Accordingly, step 142 may entail retrieval of the predefined rules from the rules database 80, as depicted in step 162. In other words, the rules database 80 may be queried to obtain the predefined rules.

Subsequently, at step 164, a check may be carried out to verify if the rules include any indicator variables. As previously noted, the indicator variables are configured to apply a mathematical function, for example, on one or more parameter variables. Also, performing any computation of parameters outside the scope of an inference engine, such as the inference engine 74 (see FIG. 3), advantageously enhances the performance of the inference engine, as previously described. Accordingly, at step 164, if it is determined that the predefined rules include one or more indicator variables, then the computations may be calculated at step 166. Consequent to step 166, pre-computed data 168 may be generated. However, at step 164, if it is determined that the predefined rules do not include any indicator variables, then raw extracted 170 data may be communicated for further processing downstream.

Figure 7:
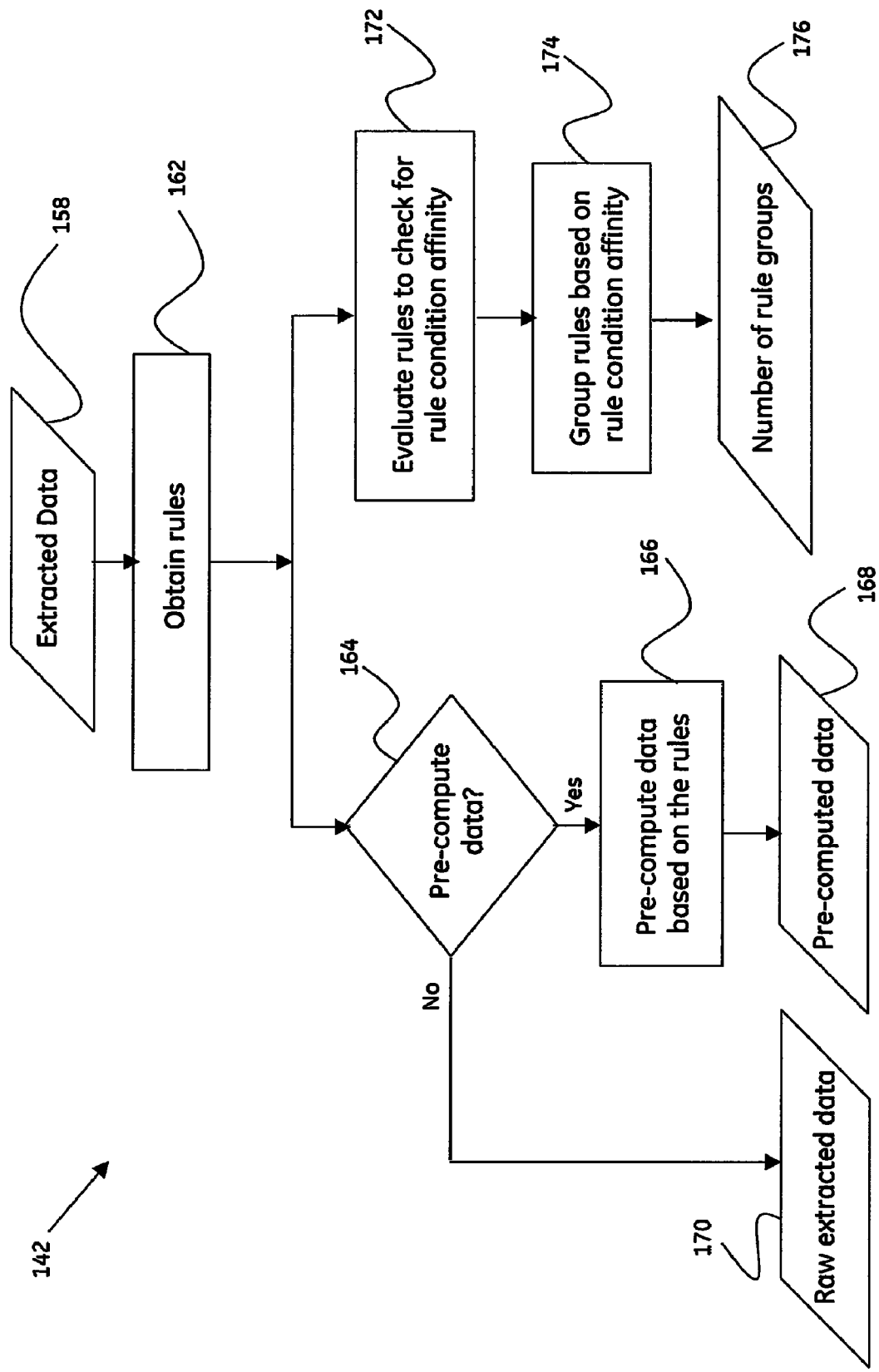
FIG. 7 is a flow chart illustrating an exemplary process of processing data, in accordance with aspects of the present technique.

The processing step 142 may also include grouping the predefined rules based on a rule condition affinity, as previously noted. Accordingly, as depicted in FIG. 7, the rules obtained from the rules database 80 may be evaluated to check for rule condition affinity, at step 172. In other words, at step 172, a check may be carried out to determine if the rules include any similar rule conditions. For example, referring now to FIG. 9, a check may be carried out to determine if Rule1-Rule6 222-232 include any similar rule conditions. Further, referring to FIG. 10, it may be noted that variables A-G are associated with the GeSysLog file 192 (see FIG. 8), while variables H-J are associated with the LOG_TTT file 196 (see FIG. 8).

Referring again to FIG. 7, following step 172, the predefined rules may be grouped together based on any similar rule conditions, at step 174. The rules may be grouped based on the number of data points, the number of rules and the number of similar rule conditions, as previously noted. With returning reference to FIG. 9, it may be noted that variables A-G are utilized in Rule1-Rule4 222-228. Further, Rule1 and Rule4 include a similar rule condition, the parameter "A". Therefore, at step 174, Rule1 and Rule4 may be grouped to form a first rule group. However, as Rule2 and Rule3 do not include any similar rule conditions, they may be grouped such that Rule2 is in a second rule group, while Rule3 is in a third rule group. Alternatively, if the data points associated with Rule2 and Rule3 include a substantially small number, then Rule2 and Rule3 may be grouped together to form a second rule group. In the present example, rules Rule1-Rule4 222-228 include 4 parameters, 3 indicators, and 4 rules. Accordingly, following steps 172-174 (see FIG. 7), three rule groups 176, the first rule group, the second rule group, and the third rule group, may be generated in accordance with the present example. Similarly, Rule5-Rule6 230-232 entail use of parameters H-J. Also, it may be noted that there is no rule condition affinity between Rule5 and Rule6. Accordingly, Rule5 and Rule6 may be processed as separate groups.

Turning again to FIG. 5, consequent to the processing step 142 based on the obtained rules, raw extracted data 170 (see FIG. 7), pre-computed data 168 (see FIG. 7) and a number of rule groups 176 (see FIG. 7) may be generated. In accordance with exemplary aspects of the present technique, at step 144, a number of inference engines may be instantiated based on the number of rule groups 176 generated. More particularly, the number of inference engines instantiated may be substantially equal to the number of rule groups 176. In one embodiment, the processing module 72 (see FIG. 3) may be configured to instantiate the inference engines. Following the instantiation of inference engines at step 144, rules in each rule group may be processed by a corresponding inference engine, at step 146. For example, in the example presented hereinabove, subsequent to step 142, three rule groups are generated. Accordingly, three instances of inference engines may be instantiated. Also, the first rule group including Rule1 and Rule4 may be processed via a first inference engine, while Rule2 in the second rule group may be processed by a second inference engine. Similarly, Rule3 in the third rule group may be processed via a third inference engine. Subsequent to step 146 output data 148 may be generated. In one embodiment, the output data 148 may be representative of a state of the system at the time of failure. However, in certain other embodiments, the output data 148 may be indicative of a trigger for actions defined in the rules. Additionally, the output data 148 may also be representative of processed data for further processing. The output data 144 may then be stored in a output data file in the data storage system 22, in one embodiment.

FIG. 12 illustrates an example of an output data file 300. Reference numeral 306 is representative of an identifier, while a parameter reference identifier may be generally represented by reference numeral 308. In addition, reference numeral 310 may be indicative of a start time of an event associated with a variable, while an end time of the event may be represented by reference numeral 312. Further, a value associated with the variable may be represented by reference numeral 314. Also, a type of system generating the variable may be represented by reference numeral 316.

Figure 6:
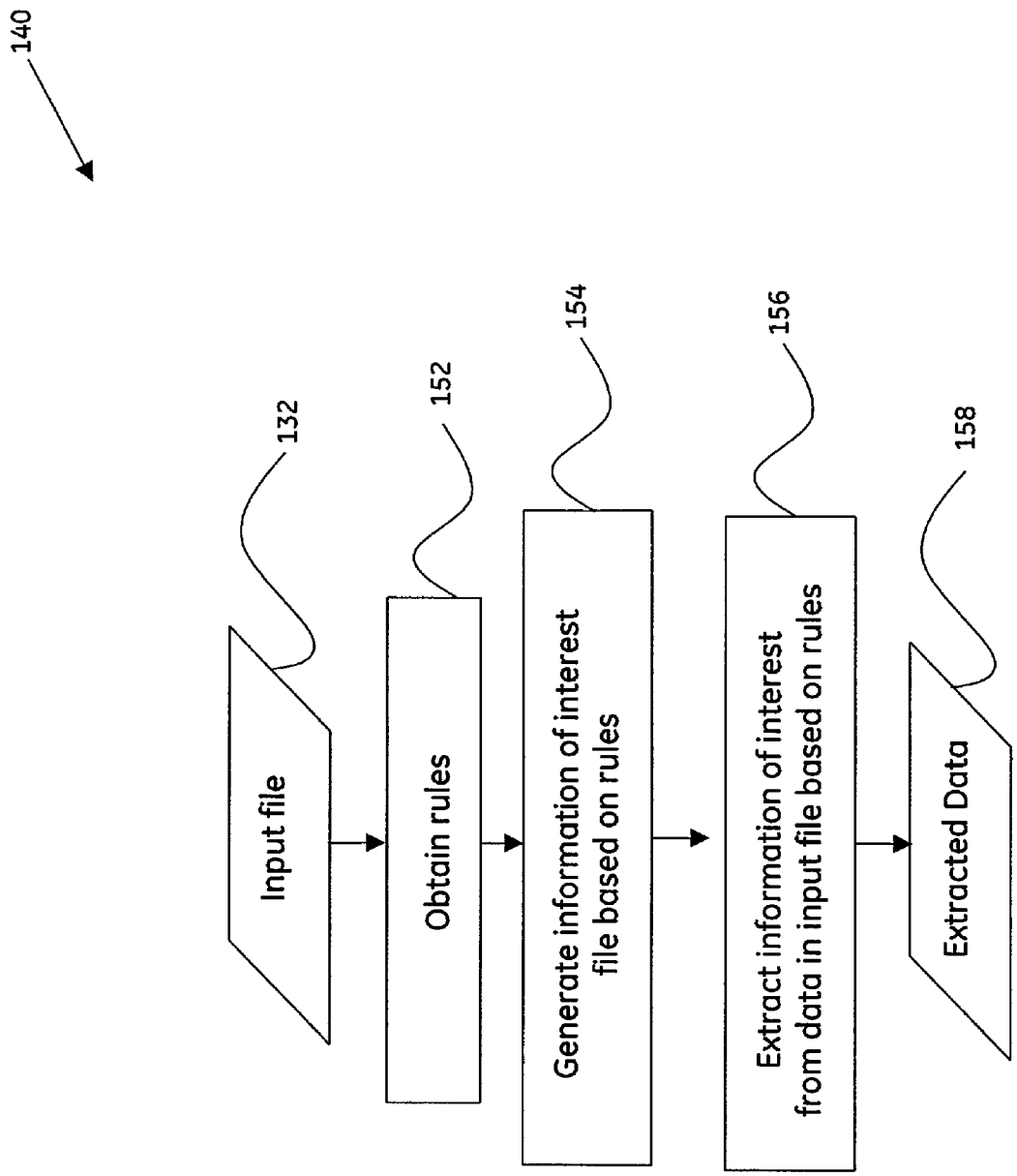
FIG. 6 is a flow chart illustrating an exemplary process of extracting data, in accordance with aspects of the present technique.

In the example illustrated in FIG. 12, identifiers 1-9 are representative of extracted data, such as extracted data 158 (see FIG. 6). More particularly, as previously noted, based on the rules for the GeSysLog file 192 (see FIG. 8), the extractor module 70 (see FIG. 3) is configured to identify that parameters "A", "B", "C", and "D" need to be extracted from the log file 132, while the indicators "E", "F" and "G" need to be computed. Accordingly, the extracted data that includes information associated with the parameters "A", "B", "C", and "D" may be associated with identifiers 1-9 and stored in the output data file 300. The extracted data represented by identifiers 1-9 may generally be represented by reference numeral 302. In a similar fashion, the indicators "E", "F" and "G" may be computed employing the pre-computation module 96 (see FIG. 4) and associated with identifiers 10-12. The computed data, such as pre-computed data 168 (see FIG. 7), may also be stored in the output data file 300. The computed data represented by identifiers 10-12 may be represented by reference numeral 304. Subsequently, the output data file 300 that includes the extracted data 302 and the computed data 304 may be stored in the data storage system 22 (see FIG. 3), in certain embodiments.

Furthermore, computed data 304 associated with identifiers 10-12 may then be further processed by one or more inference engines, such as an inference engine set 100 (see FIG. 4). More particularly, the rules associated with the computed data may be grouped using the rule-grouping module 98 (see FIG. 4). Subsequently, each of the rule groups may be processed by a corresponding inference engine.

With returning reference to FIG. 5, following the generation of output data 148, user viewable representations of the output data 148 may be generated for visualization on a display, such as display 48 (see FIG. 2), at step 150. More particularly, the user-viewable representations may be created to include representation of the output data 148 and the predefined rules. Alternatively, the user viewable representations of the output data 148 may be visualized on a second display (not shown), where the second display is different from the display 48.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or Java. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The method for detection based on predefined rules and the system for detection described hereinabove dramatically enhance the performance of the rule-based system, thereby simplifying procedural workflow of fault detection and enhancing speed of procedural time taken to detect and/or diagnose faults in machinery. Further, as the system is configured to apply any pre-processing techniques to the extracted data outside the scope of the inference engine, the speed of the inference engine may be substantially enhanced. Additionally, as the rules are grouped based on rule condition affinity, the inference engine may be configured to facilitate substantially faster execution of the rules. Also, the workflow may be simplified as one or more instances of inference engines are instantiated to separately and simultaneously process a corresponding rule group. Additionally, the method and system presented hereinabove may be used for proactive detection and/or predictive detection of the health of the system. Consequently, the workflow of fault detection may be enhanced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for fault detection, the method comprising:
   extracting data based upon one or more predefined rules;
   preprocessing the extracted data based on the predefined rules to generate two or more rule groups, wherein the preprocessing includes evaluating a rule affinity of the predefined rules and grouping the predefined rules based on the evaluated rule affinity to generate the two or more rule groups, the grouping of rules being based on a number of data points, number of rules, number of similar rule conditions, or a combination of the number of data points, number of rules and number of similar rule conditions, and the preprocessing also includes precalculating computations of the extracted data as specified by the predefined rules;
   instantiating two or more inference engines based on the generated rule groups, wherein one of the inference engines is instantiated for each rule group; and
   processing the extracted data by a corresponding inference engine based on the predefined rules to generate processed data.

2. The method of claim 1, further comprising obtaining the data from a first storage.

3. The method of claim 2, wherein the data comprises machine-readable data obtained from a data source, and wherein the data source comprises a data stream or archived data.

4. The method of claim 3, wherein the data source comprises an imaging system, and wherein the imaging system comprises one of a computed tomography imaging system, a positron emission tomography imaging system, a magnetic resonance imaging system, an X-ray imaging system, a nuclear medicine imaging system, an ultrasound imaging system, or combinations thereof.

5. The method of claim 1, wherein the predefined rules comprise a constraint, an action, or combinations thereof.

6. The method of claim 2, wherein extracting the data comprises:
   obtaining the predefined rules from a second storage; and
   extracting information of interest from the data based on the predefined rules.

7. The method of claim 6, wherein the information of interest comprises a parameter, an indicator, an error code, or combinations thereof.

8. The method of claim 2, wherein preprocessing the extracted data comprises:
   obtaining the predefined rules from a second storage; and
   computing data based upon the predefined rules.

9. The method of claim 6, further comprising storing the processed data in a third storage.

10. The method of claim 9, further comprising generating a user-viewable representation of the processed data and the predefined rules.

11. A computer readable medium comprising one or more tangible media, wherein the one or more tangible media comprise:
    code adapted to obtain data from a first storage;
    code adapted to extract the data based upon one or more predefined rules;
    code adapted to preprocess the extracted data based on the predefined rules to generate two or more rule groups, wherein the code is adapted to evaluate a rule affinity of the predefined rules and group the predefined rules based on the evaluated rule affinity to generate the two or more rule groups, the grouping of rules being based on a number of data points, number of rules, number of similar rule conditions, or a combination of the number of data points, number of rules and number of similar rule conditions, and wherein the code is also adapted to pre-calculate computations of the extracted data as specified by the predefined rules;
    code adapted to instantiate two or more inference engines based on the generated rule groups, wherein one of the inference engines is instantiated for each of the rule groups; and
    code adapted to process the extracted data by a corresponding inference engine based on the predefined rules to generate processed data.

12. The computer readable medium, as recited in claim 11, wherein the code adapted to extract the data comprises:
    code adapted to obtain the predefined rules from a second storage; and
    code adapted to extract information of interest from the data based on the predefined rules.

13. The computer readable medium, as recited in claim 11, wherein the code adapted to preprocess the extracted data comprises:
    code adapted to obtain the predefined rules from a second storage; and
    code adapted to compute data based upon the predefined rules.

14. The computer readable medium, as recited in claim 12, further comprising code adapted to store the processed data in a third storage.

15. The computer readable medium, as recited in claim 14, further comprising code adapted to generating a user-viewable representation of the processed data and the predefined rules.

16. A detection system, comprising:
    a processor-based system configured to execute a plurality of modules, the plurality of modules including an extractor module, a processing module and an interpreter module, wherein:
    the extractor module is configured to extract data based upon one or more predefined rules;
    the processing module is configured to:
       compute data based on the predefined rules;
       evaluate a rule condition affinity of the predefined rules; and
       group the predefined rules based on the evaluated rule affinity to generate two or more rule groups, the grouping of rules being based on a number of data points, number of rules, number of similar rule conditions, or a combination of the number of data points, number of rules and number of similar rule condition; and precalculate computations of the extracted data as specified by, the predefined rules; and the interpreter module is configured to interpret the extracted data based on the predefined rules to generate output data, wherein the interpreter module includes two or more inference engines, and the extracted data is interpreted by instantiating one of the inference engines for each of the two or more rule groups.

17. The detection system of claim 16, wherein the system is configured to obtain the data from a data storage subsystem configured to store data, and wherein the data storage subsystem is in operative association with the detection system.

18. The detection system of claim 16, wherein the predefined rules comprises a constraint, an action, or combinations thereof.

19. The detection system of claim 16, wherein the extractor module is further configured to:
    obtain the predefined rules from a second storage; and
    extract information of interest from the data, wherein the information of interest comprises a parameter, an indicator, an error code, or combinations thereof.

20. The detection system of claim 16, wherein the processing module is further configured to:
    obtain the predefined rules from a second storage.

21. The detection system of claim 16, further configured to store the output data in a third storage.

22. A system, comprising:
    a data source, wherein the data source comprises:
        an acquisition subsystem configured to acquire data;
        a processing subsystem in operative association with the acquisition subsystem and configured to:
            process the acquired data; and
            generate log data;
    a data storage subsystem configured to store the log data; and
    a detection subsystem in operative association with the data storage subsystem and configured to:
        extract data based upon one or more predefined rules;
        preprocess the extracted data based on the predefined rules to generate two or more rule groups, wherein the preprocessing includes evaluating a rule affinity of the predefined rules and grouping the predefined rules based on the evaluated rule affinity to generate the two or more rule groups, the grouping of rules being based on a number of data points, number of rules, number of similar rule conditions, or a combination of the number of data points, number of rules and number of similar rule conditions, the preprocessing also including computations of the extracted data as specified by the predefined rules;
        instantiate one of two or more inference engines for each of the generated rule groups; and
        process the extracted data by a corresponding inference engine based on the predefined rules to generate processed data.

* * * * *